US009208739B2

(12) United States Patent
Wu et al.

(10) Patent No.: US 9,208,739 B2
(45) Date of Patent: Dec. 8, 2015

(54) METHOD AND DEVICE OF GATE DRIVING IN LIQUID CRYSTAL DISPLAY

(75) Inventors: Tse-Hung Wu, New Taipei (TW); Li-Tang Lin, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 901 days.

(21) Appl. No.: 13/099,368

(22) Filed: May 3, 2011

(65) Prior Publication Data

US 2012/0154360 A1 Jun. 21, 2012

(30) Foreign Application Priority Data

Dec. 15, 2010 (TW) ................................ 99143907 A

(51) Int. Cl.
*G06F 3/038* (2013.01)
*G09G 3/36* (2006.01)

(52) U.S. Cl.
CPC .................................... *G09G 3/3677* (2013.01)

(58) Field of Classification Search
CPC ............. G06F 3/038; G09G 5/00; G09G 5/02
USPC ............................................ 345/211, 96, 694
See application file for complete search history.

(56) References Cited

U.S. PATENT DOCUMENTS

2006/0103618 A1* 5/2006 Miura ............................. 345/96
2008/0001941 A1* 1/2008 Miura ........................... 345/211
2008/0309654 A1 12/2008 Han
2011/0050759 A1* 3/2011 Katsutani et al. ............. 345/694

FOREIGN PATENT DOCUMENTS

CN 101644867 A 2/2010
CN 102568409 A 7/2012
TW 200500996 1/2005
TW 200734992 9/2007
TW 201019301 5/2010

* cited by examiner

*Primary Examiner* — Quan-Zhen Wang
*Assistant Examiner* — Yuk Chow
(74) *Attorney, Agent, or Firm* — Winston Hsu; Scott Margo

(57) ABSTRACT

A gate driver for controlling a display apparatus is disclosed. The gate driver includes a logic circuit for generating a plurality of switch signals, a breaking signal and a plurality of sharing signals, a plurality of buffers, each for determining to provide a first voltage or a second voltage according to one of the plurality of switch signals to generate a gate driving signal, and a charge recycle module for sharing charges with a plurality of loads according to the plurality of sharing signals.

8 Claims, 9 Drawing Sheets

METHOD AND DEVICE OF GATE DRIVING IN LIQUID CRYSTAL DISPLAY

BACKGROUND OF THE INVENTION

1. Field of the Invention

The present invention is related to a method and device of gate driving, and more particularly, to a method and device of gate driving which adjust gate driving signals through charge recycling and reutilization.

2. Description of the Prior Art

A liquid crystal display (LCD) monitor has characteristics of light weight, low power consumption, zero radiation, etc. and is widely used in many information technology (IT) products, such as computer systems, mobile phones, and personal digital assistants (PDAs). The operating principle of the LCD monitor is based on the fact that different twist states of liquid crystals result in different polarization and refraction effects on light passing through the liquid crystals. Thus, the liquid crystals can be used to control amount of light emitted from the LCD monitor by arranging the liquid crystals in different twist states, so as to produce light outputs at various brightnesses, and diverse gray levels of red, green and blue light.

Please refer to FIG. 1, which is a schematic diagram of a thin film transistor (TFT) LCD monitor 10 of the prior art. The LCD monitor 10 includes an LCD panel 100, a source driver 102, a gate driver 104 and a voltage generator 106. The LCD panel 100 is composed of two substrates, and space between the substrates is filled with liquid crystal materials. One of the substrates is installed with a plurality of data lines 108, a plurality of scan lines (or gate lines) 110 and a plurality of TFTs 112, and another substrate is installed with a common electrode for providing a common signal Vcom outputted by the voltage generator 106. The TFTs 112 are arranged as a matrix on the LCD panel 100. Accordingly, each data line 108 corresponds to a column of the LCD panel 100, each scan line 100 corresponds to a row of the LCD panel 100, and each TFT 112 corresponds to a pixel. Note that the LCD panel 100 composed of the two substrates can be regarded as an equivalent capacitor 114.

In FIG. 1, the gate driver 104 sequentially generate the gate driving signals VG_1-VG_M to row by row activate the TFTs 112 and update pixel data stored in the equivalent capacitors 114. In detail, please refer to FIG. 2, which is a schematic diagram of the gate driver 104. The gate driver 104 includes a logic circuit 105 and buffers 107_1-107_M. Load modules 109_1-109_M are equivalent circuits of loads. The logic circuit 105 controls transistor switches of the buffers 107_1-107_M to alternatively provide a high voltage VGG or a low voltage VEE to the load modules 109_1-109_M, so as to create square waves of the gate driving signals VG_1-VG_M.

However, since parasitical capacitors exist between the equivalent capacitors 114 and gates of the TFTs 112, variations of the gate driving signals VG_1-VG_M couple into the equivalent capacitors 114 via the parasitical capacitors during backward edges of the square waves of the gate driving signals VG_1-VG_M, such that the equivalent capacitors 114 store image contents with biases. In order to the coupling effect, the gate driver 104 adjusts waveforms of the square waves of the gate driving signals VG_1-VG_M, as illustrated in FIG. 3. As a result, instant variations of the gate driving signals VG_1-VG_M no longer affect the image contents stored in the equivalent capacitors 114. Certainly, to generate the waveform shown in FIG. 3, the gate driver 104 has to include additional control circuits.

Therefore, adjusting the waveforms of the gate driving signals more economically has been a major focus of the industry.

SUMMARY OF THE INVENTION

It is therefore a primary objective of the claimed invention to provide a gate driver and a gate driving method.

The present invention discloses a gate driver for controlling a display apparatus. The gate driver comprises a logic circuit for generating a plurality of switch signals, a breaking signal and a plurality of sharing signals, a plurality of buffers coupled to the logic circuit, each comprising a first end coupled to the logic circuit, a second end coupled to a first voltage source, a third end coupled to a second voltage source, and a fourth end, and utilized for determining to provide a first voltage or a second voltage according to one of the plurality of switch signals to generate a gate driving signal, and a charge recycle module coupled between the plurality of buffers and a reference voltage source, for sharing charges with a plurality of loads according to the plurality of sharing signals.

The present invention further discloses a gate driving method for controlling a display apparatus. The gate driving method comprises outputting a disable voltage as a gate driving signal, stopping outputting the disable voltage and releasing charges from an adjustment capacitor to increase the gate driving signal to a first default voltage, outputting an enable voltage as the gate driving signal, stopping outputting the enable voltage and recycling gate charges to the adjustment capacitor to decrease the gate driving signal to a second default voltage, and re-outputting the disable voltage as the gate driving signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
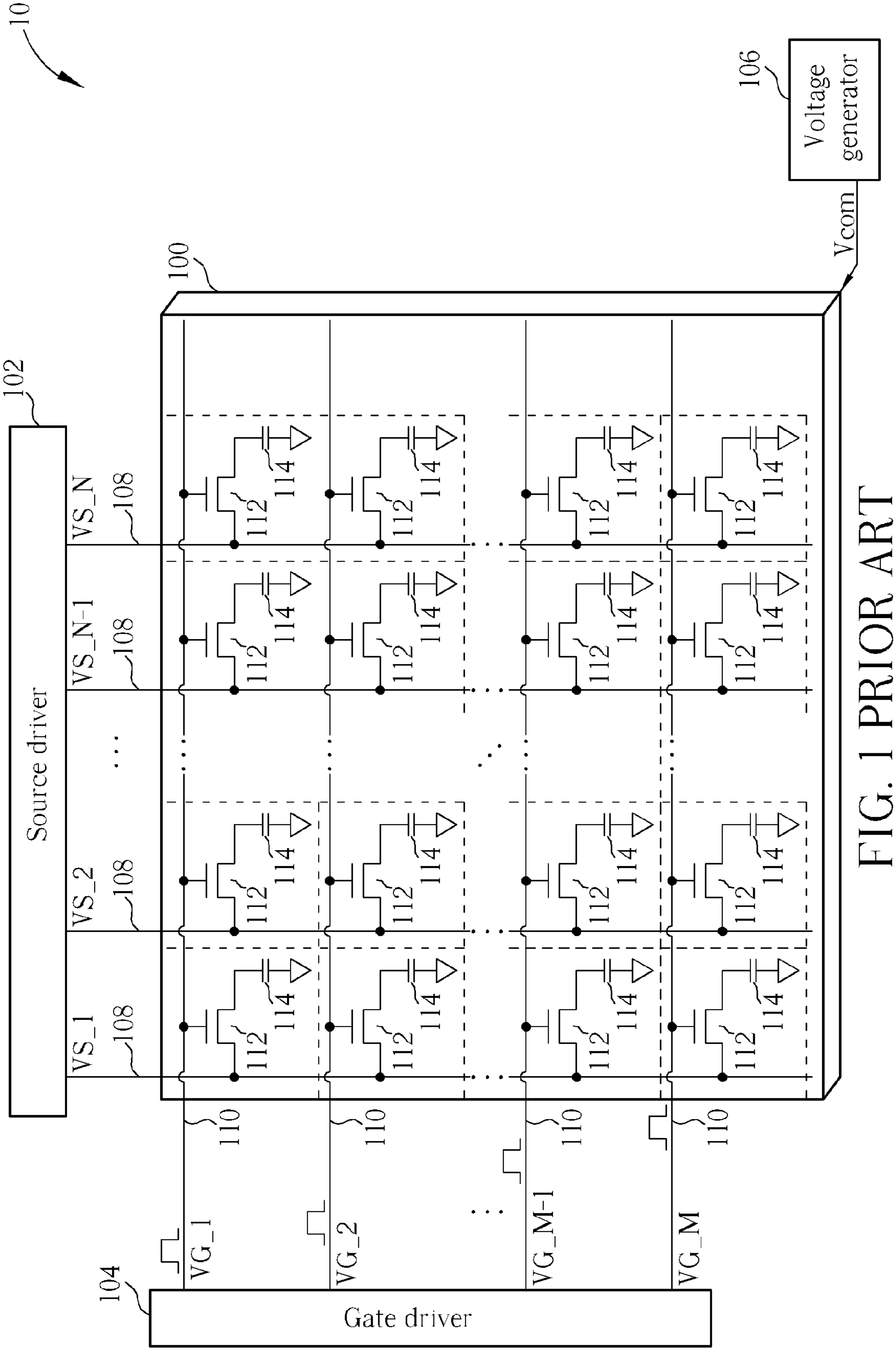
FIG. 1 PRIOR ART
FIG. 1 is a schematic diagram of a TFT LCD monitor of the prior art.
Figure 2:
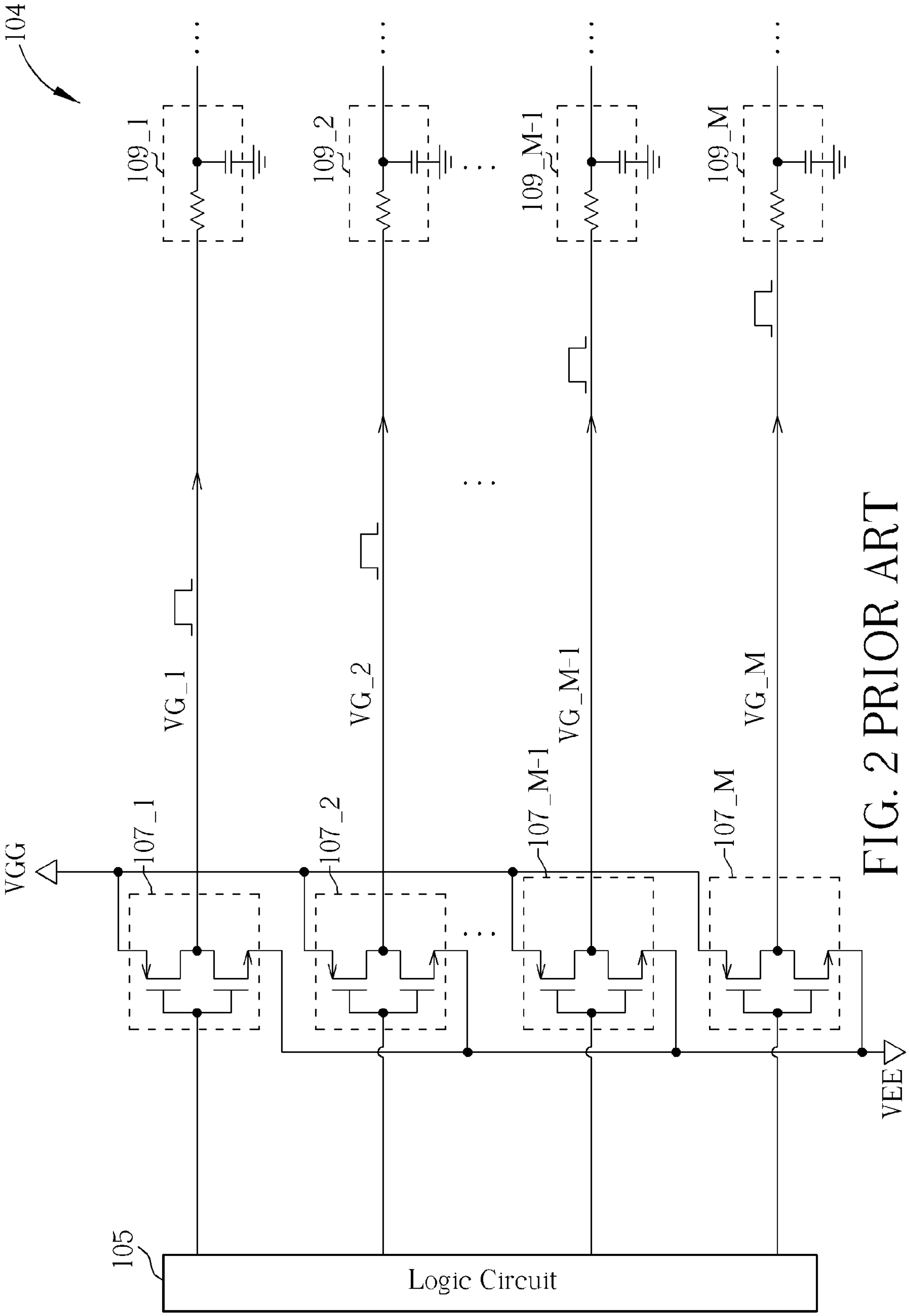
FIG. 2 PRIOR ART
FIG. 2 is a schematic diagram of a gate driver of the TFT LCD monitor shown in FIG. 1.
Figure 3:
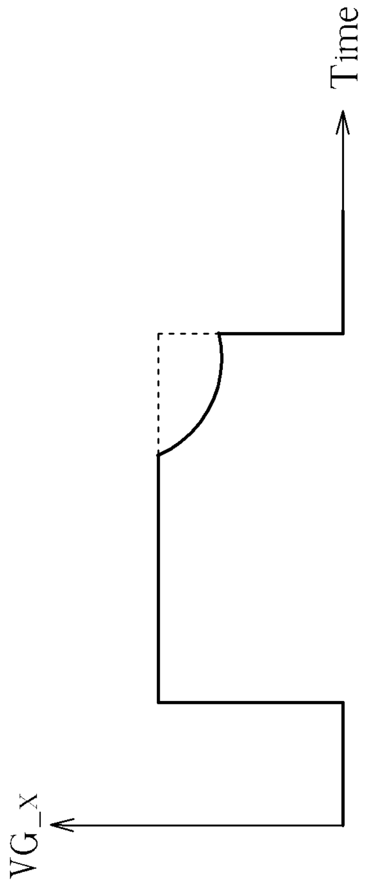
FIG. 3 is a timing diagram of a gate driving signal.
Figure 4:
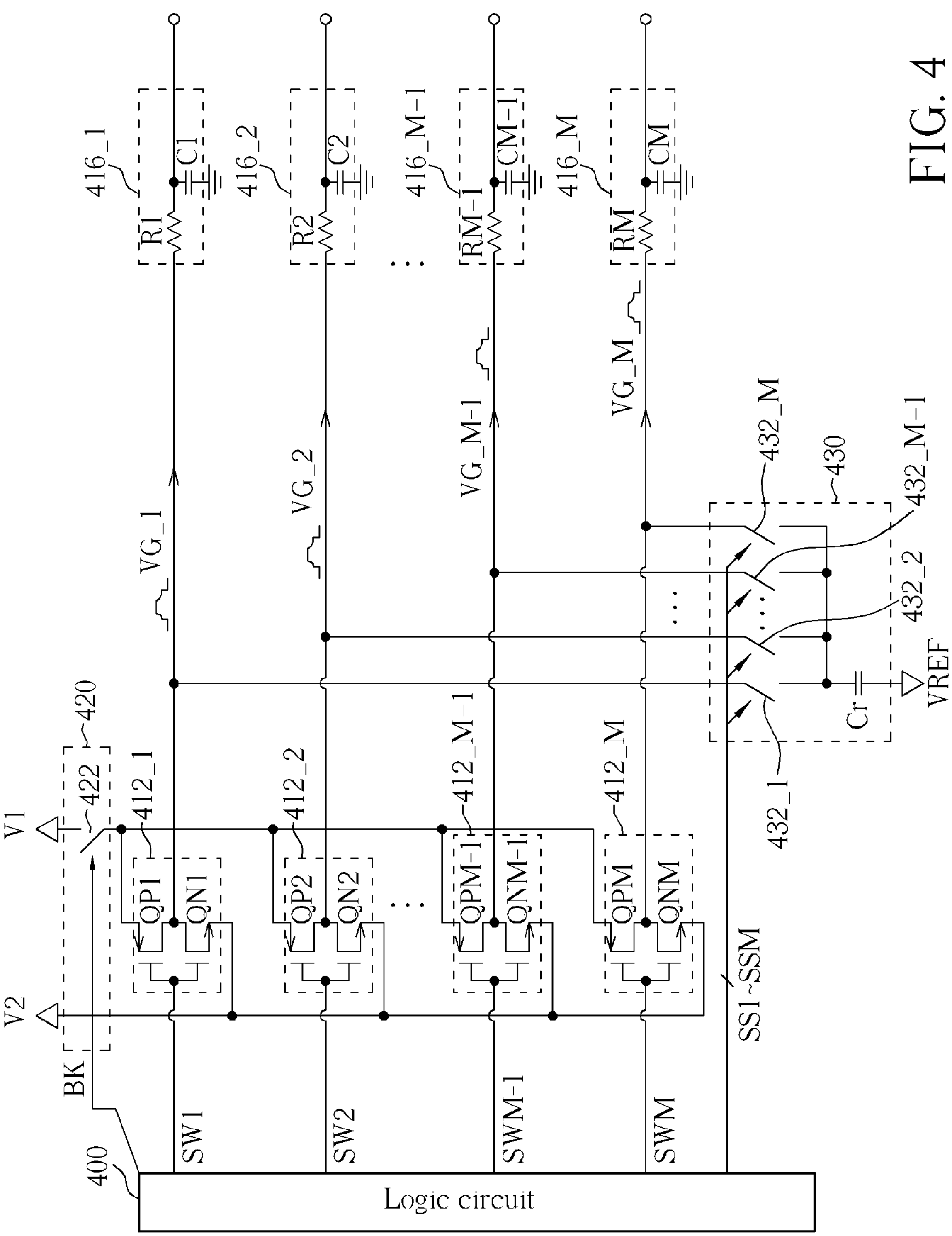
FIG. 4 is a schematic diagram of a gate driver according to an embodiment of the present invention.

Please refer to FIG. 4, which is a schematic diagram of a gate driver 40 according to an embodiment of the present invention. The gate driver 40 is utilized for controlling pixel updating timing of a liquid crystal display (LCD) apparatus, i.e. controlling gate voltages of thin film transistors (TFT) 112 shown in FIG. 1. The gate driver 40 includes a logic circuit 400, buffers 412_1-412_M, a switch module 420 and a charge recycle module 430. The logic circuit 440 is utilized for generating switch signals SW1-SWM, a breaking signal BK and sharing signals SS1-SSM. The buffers 412_1-412_M are utilized for determining to provide a first voltage V1 or a second voltage V2 respectively according to the switch signals SW1-SWM to generate gate driving signal VG_1-VG_M, which are respectively utilized for scanning a row of TFTs. The switch module 420 is utilized for stopping outputting the first voltage V1 to load modules 416_1-416_M according to the breaking signal BK. Note that, the load modules 416_1-416_M are equivalent circuits of loads. Finally, the charge recycle module 430 is utilized for sharing charges with the load modules 416_1-416_M according to the sharing signals SS1-SSM to adjust the waveforms of the gate driving signals VG_1-VG_M. Since the gate driving signals VG_1-VG_M indicate activation timing of the TFTs 112 in form of square wave, the switch module 420 is particularly open during forward and backward edges of the square waves, and meanwhile, the charge recycle module 430 is connected to a load module 416_*x* which is just receiving a square wave. As a result, the charge recycle module 430 and the load module 416_*x* independently share stored charges to adjust waveforms of the forward and backward edges of the square waves of the gate driving signals VG_1-VG_M.

In short, to adjust the waveforms of the gate driving signals VG_1-VG_M, the gate driver 40 additionally includes the charge recycle module 430 to adjust charges stored in the load modules 416_1-416_M. During the forward and backward edges of the square waves of the gate driving signals VG_1-VG_M, the charge recycle module 430 and the load modules 416_1-416_M share the stored charges to generate the square waves of the gate driving signals VG_1-VG_M with less electric energy through recycling and re-utilizing the charges. Since charge sharing is a gradual process, the forward and backward edges of the square waves of the gate driving signals VG_1-VG_M vary smoothly, and therefore the coupling effect can be mitigated. Compared to the generation process of the square waves of the prior art, the charge recycle module 430 recycles charges from the load modules when the gate driving signals VG_1-VG_M are at the first voltage V1, and re-utilizes the recycled charges to generate a next square wave to reduce power consumption of the gate driver 40 instead of alternatively charging and discharging the load modules 109_1~109_M through external voltage sources, which leads to power dissipation. Through charge redistribution, the recycled charges enhance the gate driving signal VG_1-VG_M to a first default voltage in advance, such that the external voltage source can increase the gate driving signal VG_1-VG_M to the first voltage V1 with less electric energy.

In detail, the charge recycle module 430 includes an adjustment capacitor Cr and switches 432_1-432_M. The switches 432_1-432_M are utilized for determining whether the adjustment capacitor Cr shares stored charges with the load modules 416_1-416_M according to the sharing signals SS1-SSM. One end of the adjustment capacitor Cr is coupled to a reference voltage source, and therefore a circuit designer can control an amount of the recycled and re-utilized charges through selecting a preferable reference voltage VREF provided by the reference voltage source, so as to determine the first default voltage and an adjustment margin. The buffers 412_1-412_M includes p-type field-effect transistors (FETs) QP1-QPM and n-type FETs QN1-QNM, and are utilized for determining whether to provide the first voltage V1 or the second voltage V2 to the load modules 416_1-416_M according to the switch signals SW_1-SW_M. The load modules 416_1-416_M respectively include load resistor R1-RM and load capacitors C1-CM, and are utilized for storing or outputting charges in response to switch operations of the buffers 412_1-412_M to generate the gate driving signals VG_1-VG_M. In addition, in order to implement the charge sharing operations, the switch module 420 preferably includes a switch 422 to break a power supply path of the first voltage V1 according to the breaking signal BK during the forward and backward edges of the square waves of the gate driving signals VG_1-VG_M. As a result, the load capacitors C1-CM and the adjustment capacitor Cr can independently share stored charges.

Figure 5:
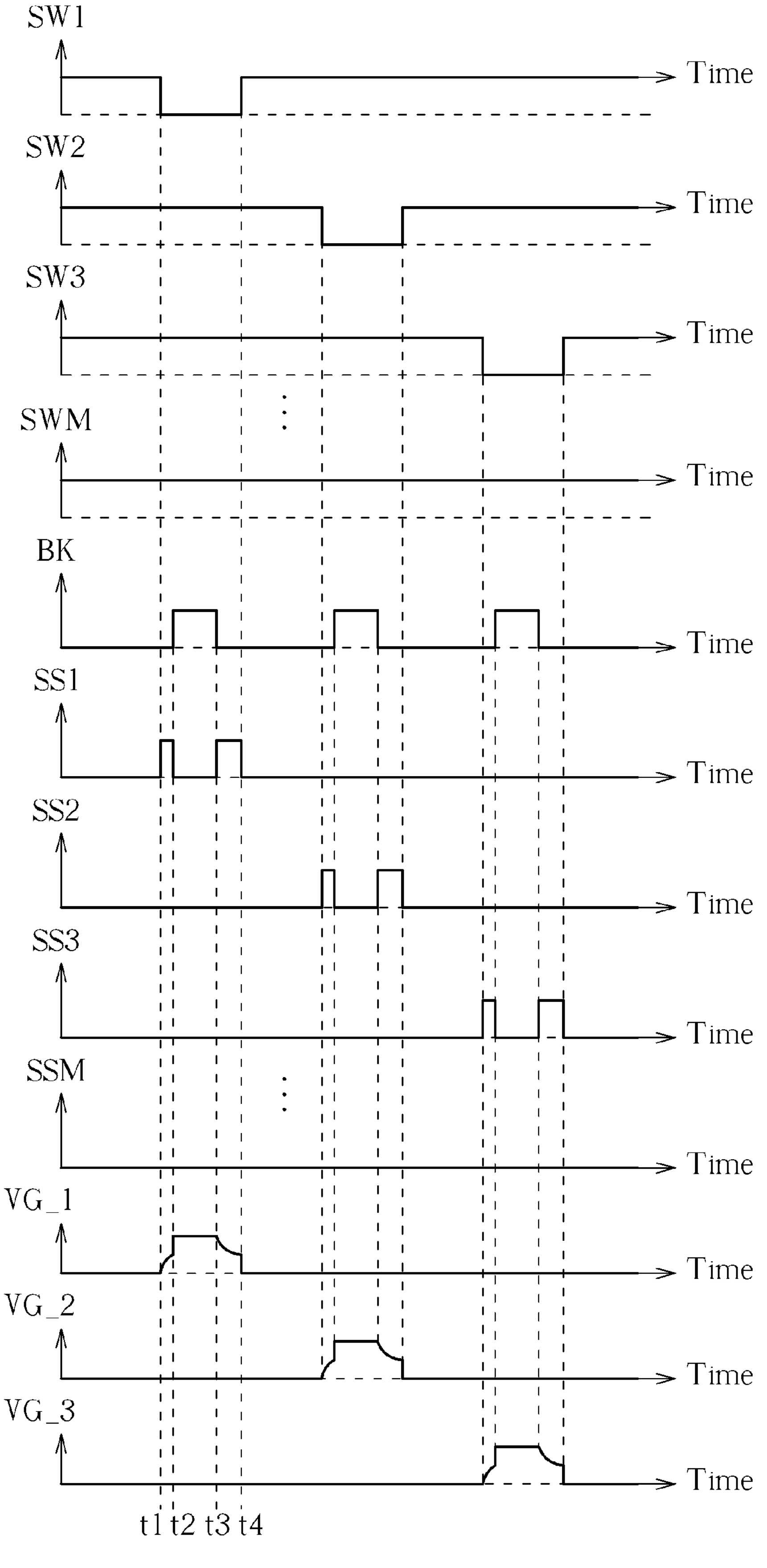
FIG. 5 is a timing diagram of switch signals, a breaking signal, sharing signals and gate driving signals of the gate driver shown in FIG. 4.

For example, please refer to FIG. 5, which is a timing diagram of the switch signals SW_1-SW_M, the breaking signal BK, the sharing signals SS1-SSM and the gate driving signals VG_1-VG_3, and illustrates a generation process of the gate driving signal VG_1. The breaking signal BK indicates the switch 422 to break the power supply path of the first voltage V1 during the forward edge (between times t1, t2) of the square wave of the gate driving signal VG_1. The switch signals SW_1-SW_M indicate the buffers 412_1-412_M to break electric connections among the load modules 416_1-416_M. The sharing signal SS1 indicates the switch 432_1 to connect the adjustment capacitor Cr and the load capacitor C1, such that the charges stored in the adjustment capacitor Cr are transferred to the load capacitor C1 to enhance the gate driving signal VG_1 to the first default voltage in advance. During a middle interval (between times t2, t3) of the square wave of the gate driving signal VG_1, the breaking signal BK indicates the switch 422 to re-transmit the first voltage V1 to the load module 416_1. The switch signal SW_1 indicates the buffers 412_1-412_M to transmit the first voltage V1. The sharing signal SS1 indicates the switch 432_1 to isolate the adjustment capacitor Cr from the load capacitor C1 to enable the gate driving signal VG_1. Finally, during the backward edge (between times t3, t4) of the square wave of the gate driving signal VG_1, the breaking signal BK re-indicates the switch 422 to break the power supply path of the first voltage V1. The switch signals SW_1-SW_M indicate the buffers 412_1-412_M to break the electric connections among the load modules 416_1-416_M. The sharing signal SS1 indicates the switch 432_1 to connect the adjustment capacitor Cr and the load capacitor C1, such that charges stored in the load capacitor C1 are recycled to the adjustment capacitor Cr as reserve charges, which charge the load capacitor C1 in advance to generate the square wave of the gate driving signal VG_2. Generation processes of the gate driving signals VG_2-VG_M is similar to the generation process of the gate driving signals VG_1, and are not further narrated herein. Therefore, through sharing charges during the forward and backward edges of the square waves of the gate driving signals VG_1-VG_M, the gate driver 40 can recycle and re-utilize load charges to economically adjust the waveforms of the gate driving signals VG_1-VG_M.

Figure 6:
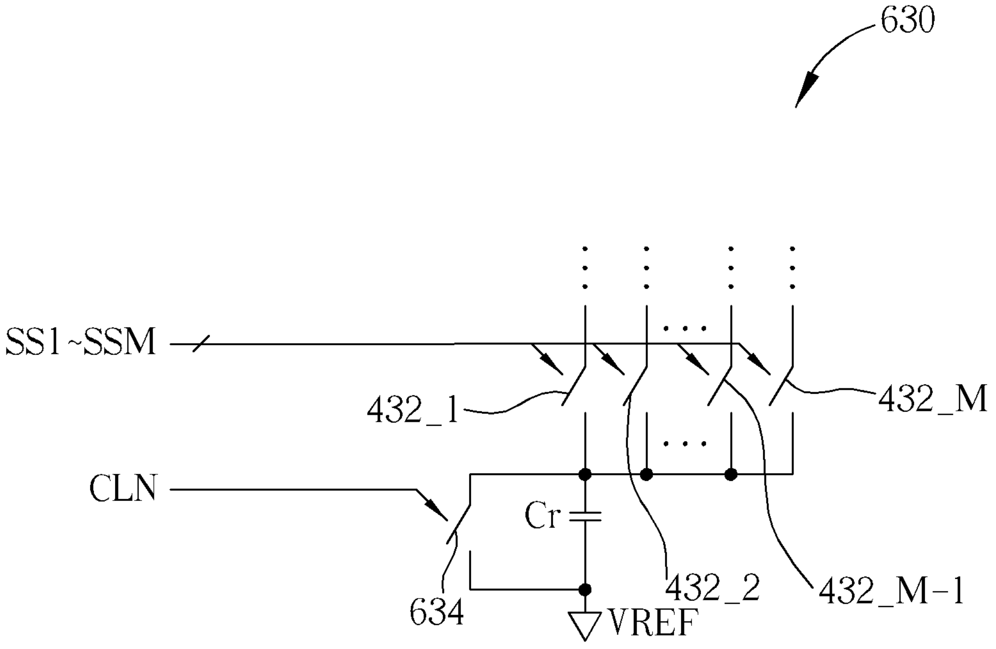
FIG. 6 is a schematic diagram of an alternative embodiment of a charge recycle module of the gate driver shown in FIG. 4.

Note that, the adjustment capacitor Cr still stores some charges after the adjustment capacitor Cr and the load capacitors C1-CM share stored charges during the forward edges of the square waves of the gate driving signals VG_1-VG_M, which leads to a decline in efficiency of a next recycling operation of the adjustment capacitor Cr, and therefore an adjustment margin of the next recycling operation shrinks. To guarantee that the adjustment margins for the gate driving signals VG_1-VG_M are consistent, please refer to FIG. 6, which is a schematic diagram of a charge recycle module 630, which is an alternative embodiment of the charge recycle module 430. The charge recycle module 630 additionally includes a switch 634 coupled to two ends of the adjustment capacitor Cr and utilized for connecting the two ends of the adjustment capacitor Cr during the middle intervals of the square waves of the gate driving signals VG_1-VG_M according to a clean signal CLN provided by the logic circuit 400 to clean the charges stored in the adjustment capacitor Cr and guarantee that the adjustment margins for the gate driving signals VG_1-VG_M are consistent.

Figure 7:
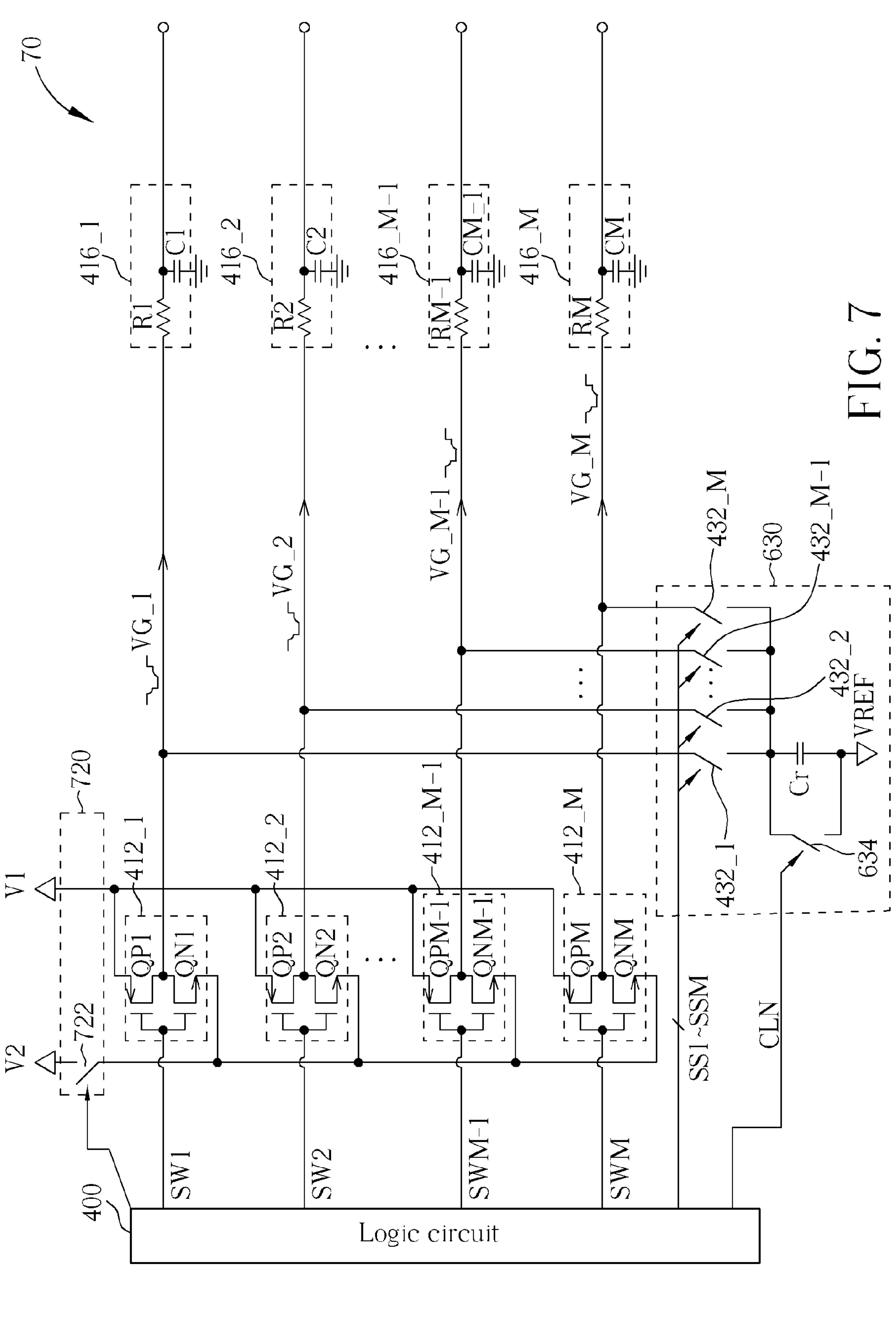
FIG. 7 is a schematic diagram of a gate driver according to an embodiment of the present invention.
Figure 8:
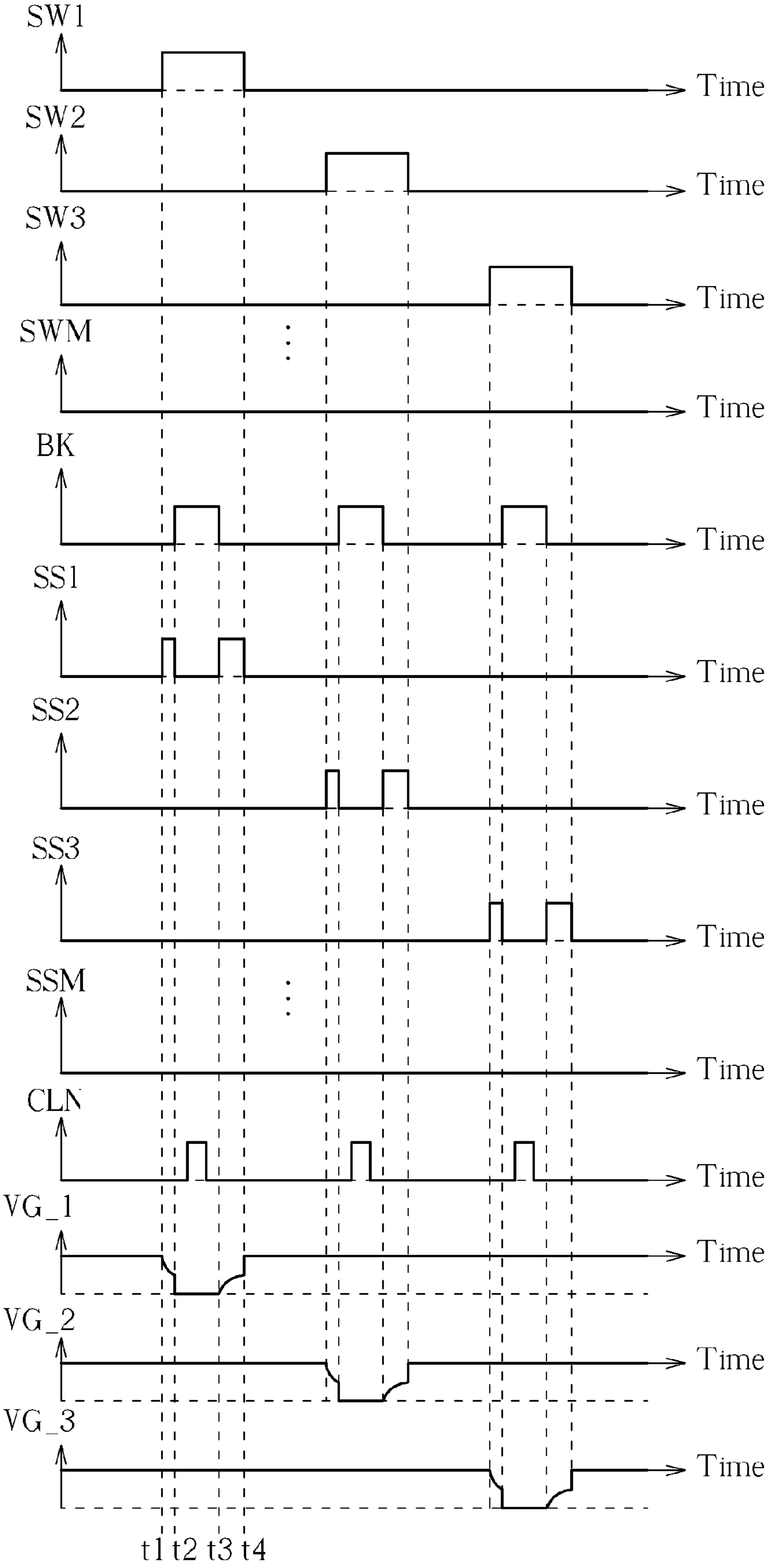
FIG. 8 is a timing diagram of switch signals, a breaking signal, sharing signals, a clean signal and gate driving signals of the gate driver shown in FIG. 7.

Note that, the gate driver 40 is designed for an LCD apparatus employing N-type TFTs in pixel cells. That is, the N-type TFTs are enabled when the gate driving signals VG_1-VG_M are at the first voltage V1 to update pixel contents. Alternatively, an LCD may employ P-type TFTs in pixel cells. In such a situation, please refer to FIG. 7, which is a schematic diagram of a gate driver 70 which is an alternative embodiment of the gate driver 40. The gate driver 70 is utilized for scanning the P-type TFTs of the LCD apparatus. In the gate driver 70, a switch module 720 replaces the switch module 420 of the gate driver 40, and includes a switch 722 which breaks a power supply path of the second voltage V2 according to the breaking signal BK. Please refer to FIG. 8, which is a schematic diagram of the switch signals SW_1-SW_M, the breaking signal BK, the sharing signals SS1-SSM, the clean signal CLN and the gate driving signals VG_1-VG_3 of the gate driver 70. FIG. 8 is similar to FIG. 5, and merely differs in polarities of the gate driving signals VG_1-VG_M. Related description can be referred in the above, and is not narrated herein.

Figure 9:
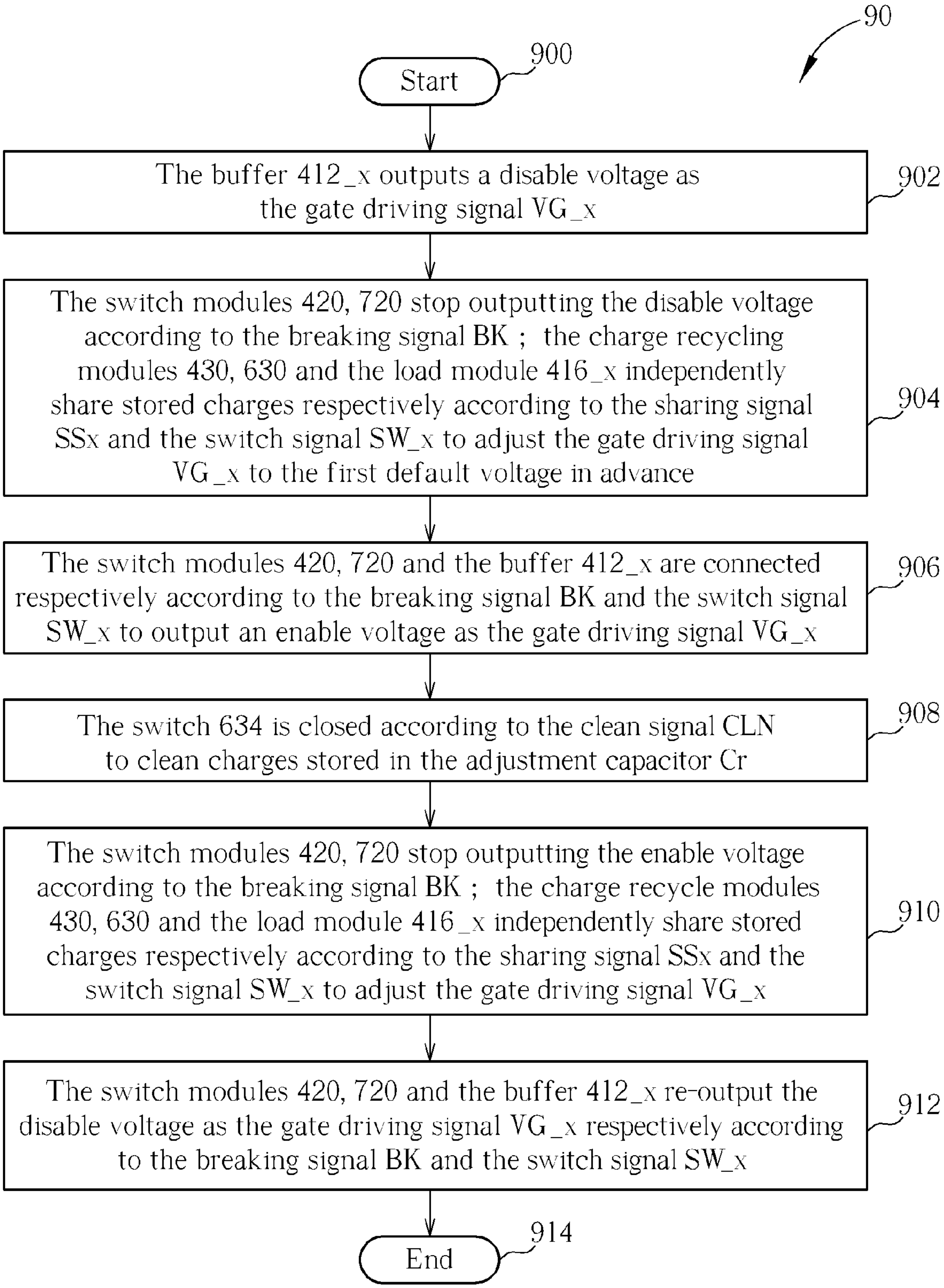
FIG. 9 is a schematic diagram of a gate driving process according to an embodiment of the present invention.

The generation processes of the gate drivers 40, 70 for the gate driving signals VG_1-VG_M can be summarized into a gate driving process 90, as illustrated in FIG. 9. The gate driving process 90 includes the following steps:

Step 900: Start.

Step 902: The buffer 412_*x* outputs a disable voltage as the gate driving signal VG_x.

Step 904: The switch modules 420, 720 stop outputting the disable voltage according to the breaking signal BK; the charge recycling modules 430, 630 and the load module 416_*x* independently share stored charges respectively according to the sharing signal SSx and the switch signal SW_x to adjust the gate driving signal VG_x to the first default voltage in advance.

Step 906: The switch modules 420, 720 and the buffer 412_*x* are connected respectively according to the breaking signal BK and the switch signal SW_x to output an enable voltage as the gate driving signal VG_x.

Step 908: The switch 634 is closed according to the clean signal CLN to clean charges stored in the adjustment capacitor Cr.

Step 910: The switch modules 420, 720 stop outputting the enable voltage according to the breaking signal BK; the charge recycle modules 430, 630 and the load module 416_*x* independently share stored charges respectively according to the sharing signal SSx and the switch signal SW_x to adjust the gate driving signal VG_x.

Step 912: The switch modules 420, 720 and the buffer 412_*x* re-output the disable voltage as the gate driving signal VG_x respectively according to the breaking signal BK and the switch signal SW_x.

Step 914: End.

In the gate driving process 90, if the TFTs are N-type FETs, the disable voltage is a low voltage, and the enable voltage is a high voltage. Inversely, if the TFTs are P-type FETs, the disable voltage is the high voltage, and the enable voltage is the low voltage.

In the prior art, variations of the gate driving signals VG_1-VG_M are coupled into the equivalent capacitors 114 via parasitic capacitors, such that the equivalent capacitors 114 store image contents with biases. In comparison, according to the present invention, the power supply path is cutoff through switch operations during the forward and backward edges of the gate driving signals VG_1-VG_M, and therefore the load modules 416_1-416_M and the charge recycle modules 430, 630 can independently share stored charges. Since charge sharing is a gradual process, the gate driving signals VG_1-VG_M decrease smoothly, and therefore the coupling effect is mitigated. In addition, through recycling charges from the load modules 416_1-416_M, the charge recycle modules 430, 630 enhance the gate driving signals VG_1-VG_M to the first default (quasi-enable) voltage in advance to reduce power consumption of the gate drivers 40, 70.

To sum up, the present invention mitigates variations of the square waves of the gate driving signals through charge recycle and charge re-utilization without employing additional complex control circuits to economically adjust the wave forms of the gate driving signals.

Those skilled in the art will readily observe that numerous modifications and alterations of the device and method may be made while retaining the teachings of the invention.

What is claimed is:

1. A gate driver for controlling a display apparatus, the gate driver comprising:

a logic circuit, for generating a plurality of switch signals, a breaking signal and a plurality of sharing signals;

a plurality of gate buffers, coupled to the logic circuit, each comprising a first end coupled to the logic circuit, a second end coupled to a first voltage source, a third end coupled to a second voltage source, and a fourth end, and utilized for determining to provide a first voltage or a second voltage according to one of the plurality of switch signals to generate a gate driving signal; and a charge recycle module, coupled between the plurality of gate buffers and a reference voltage source, for sharing charges with a plurality of loads according to the plurality of sharing signals;

wherein the charge recycle module comprises:

an adjustment capacitor, comprising a first end coupled to the reference voltage source, and a second end; and a plurality of switches, each directly connected between the second end and the fourth end of one of the plurality of gate buffers, for connecting the adjustment capacitor and the gate buffer during a forward edge and a backward edge of a square wave of the gate driving signal corresponding to the gate buffer according to one of the plurality of sharing signals.

2. The gate driver of claim 1 further comprising a switch module, coupled between the plurality of gate buffers and the first and second voltage sources, for electrically isolating the first voltage source or the second voltage source from the plurality of gate buffers.

3. The gate driver of claim 2, wherein the switch module is open during a forward edge and a backward edge of a square wave of each of the gate driving signals according to the breaking signal, and the sharing signal corresponding to the gate driving signal indicates the charge recycle module to connect to the gate buffer corresponding to the gate driving signal, so as to enable the charge recycle module and one of the plurality of loads to share stored charges.

4. The gate driver of claim 2, wherein the switch module comprises:

a switch, coupled between the plurality of gate buffers and the first voltage source, for electrically isolating the first voltage source from the plurality of gate buffers during the plurality of forward edges and the plurality of backward edges of the plurality of square waves of the plurality of gate driving signals according to the breaking signal.

5. The gate driver of claim 2, wherein the switch module comprises:

a switch, coupled between the plurality of gate buffers and the second voltage source, for electrically isolating the second voltage source from the plurality of gate buffers during the plurality of forward edges and the plurality of backward edges of the plurality of square waves of the plurality of gate driving signals according to the breaking signal.

6. The gate driver of claim 1, wherein each of plurality of gate buffers comprises:

a P-type field-effect transistor (FET), comprising a gate end coupled to the first end, a source end coupled to the second end, and a drain end coupled to the fourth end, for determining electrical connection between the fourth end and the first voltage source according to the switch signal; and an N-type FET, comprising a gate end coupled to the first end, a source end coupled to the third end, and a drain end coupled to the fourth end, for determining electrical connection between the fourth end and the second voltage source according to the switch signal.

7. The gate driver of claim 1, wherein the charge recycle module further comprises:

a switch, coupled between the first end and the second end of the adjustment capacitor, for connecting the first end and the second end according to a clean signal.

8. The gate driver of claim 7, wherein the logic circuit is further utilized for generating the clean signal to indicate the adjustment capacitor to erase stored charges during a plurality of middle intervals of the plurality of square waves of the plurality of gate driving signals.

* * * * *